3,207,075
OUT-OF-LINE ROCKET IGNITER
Robert H. Semenoff, Silver Spring, Md., assignor to the United States of America as represented by the Secretary of the Navy
Filed Jan. 23, 1959, Ser. No. 788,693
3 Claims. (Cl. 102—70.2)
(Granted under Title 35, U.S. Code (1952), sec. 266)

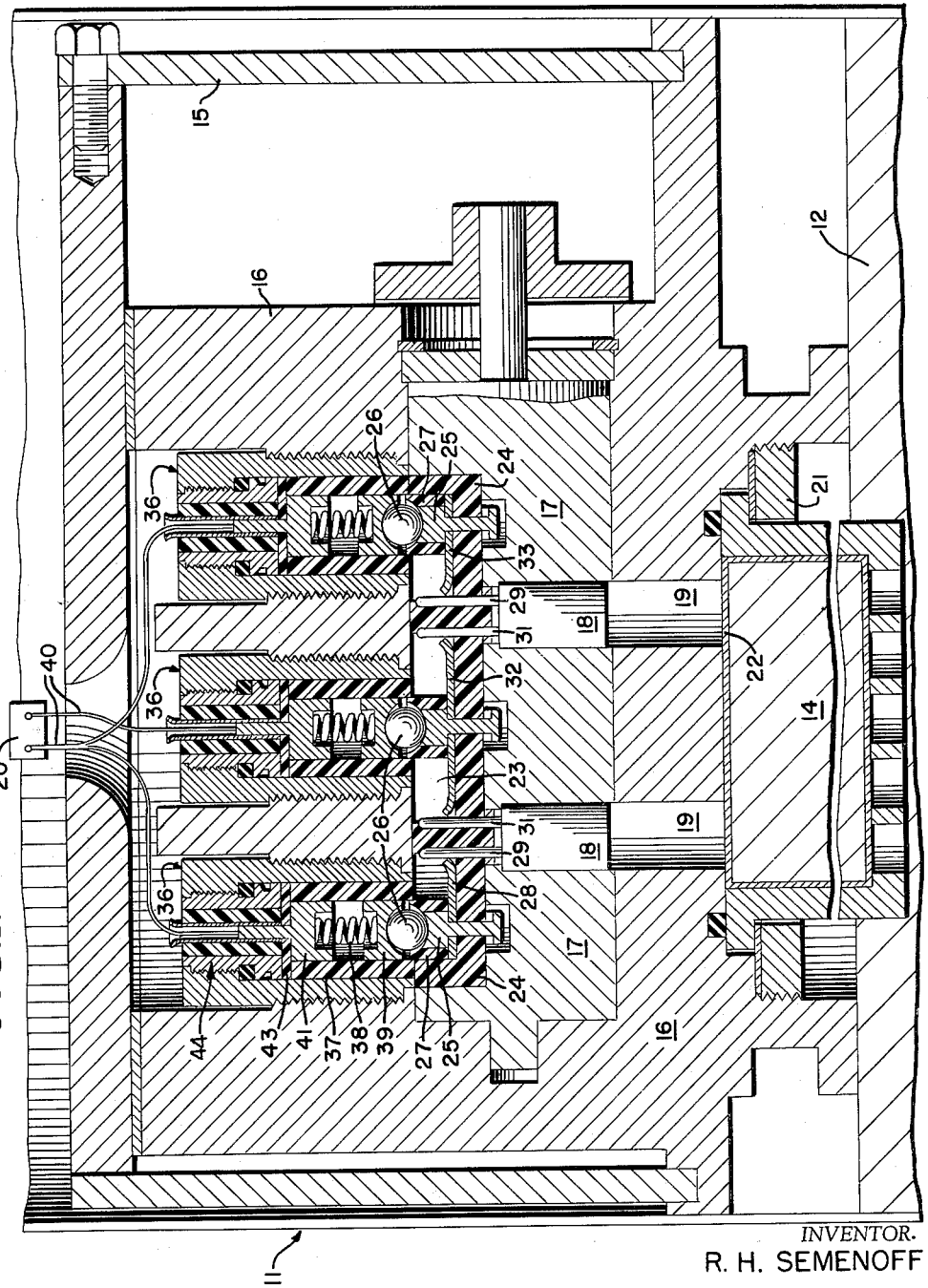

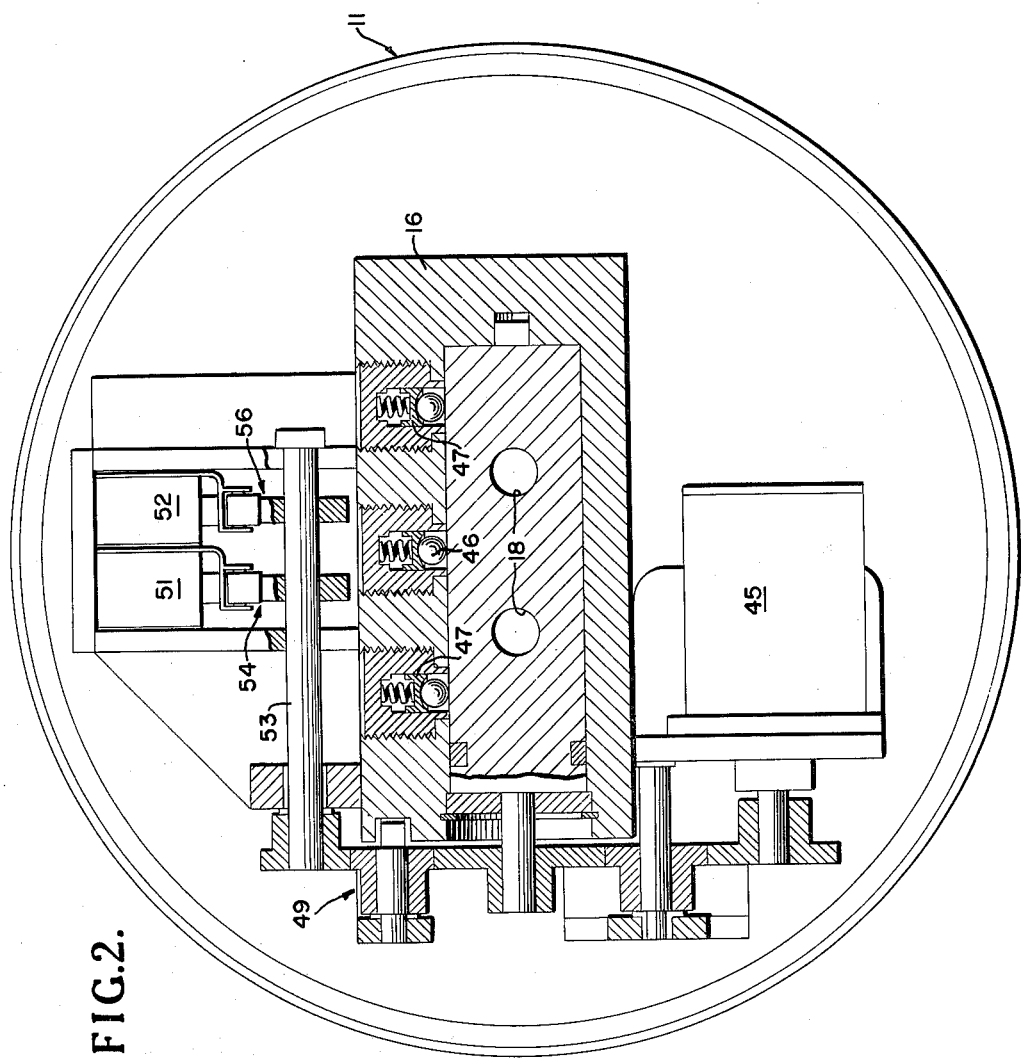

The invention described herein may be manufactured and used by or for the Government of the United States of America for governmental purposes without the payment of any royalties thereon or therefor.

This invention is concerned with the ignition of a solid propellant rocket motor. More particularly, it is concerned with an out-of-line rocket motor igniter.

At present, solid propellant rocket motors are initiated by igniters which take the form of a plurality of squibs wired together and buried in a primer element. For safety, the squibs are shorted to the motor casing until the rocket is ready for firing. The squib shorting wires are removed or destroyed when the missile is about to be fired so that stray electric currents in the missile can set off the squibs prematurely. If the squibs are accidentally fired, the rocket motor is ignited thereby endangering the lives of personnel in the area adjacent to the rocket motor.

It is an object of this invention to provide an igniter for a solid propellant rocket motor which igniter includes a mechanical safety feature in addition to a novel form of electrical safety device.

Another object is the provision of a motor driven squib cylinder for a rocket igniter which cylinder may be rotated from an in-line to an out-of-line position with respect to the primer element thereby preventing premature ignition of the primer element by stray electric currents in the missile.

Still another object of this invention is to provide a rotatable squib cylinder having a plurality of contacts which are grounded when the igniter is in the safe position and are connected to the source of igniting current via a ball detent contact when the ignit_r is ready for firing.

Another object is the provision of a new and improved rocket igniter wherein it is impossible to ignite the rocket motor even if the squibs in the igniter are accidentally initiated while the igniter is in the safe position.

These and many other objects will become more readily apparent to those skilled in this art when the following specification is considered along with the attendant drawings wherein like numerals designate like or similar parts throughout the various views and in which:

FIG. 1 is a longitudinal section of an igniter constructed in accordance with the principles of this invention and within a typical solid propellant missile; and FIG. 2 is another section of the igniter taken at 90° to the section of FIG. 1.

In FIG. 1, a typical missile 11 is shown having a rocket motor section 12, an out-of-line igniter constructed according to the principles of this invention, and a primer element 14 extending into the rocket motor section 12.

The igniter is composed of a casing 15 including a body 16 having a hollow interior portion in which is disposed a rotatable cylinder 17 having a pair of parallel bores filled with squibs 18. When the igniter is in the armed position as shown in FIG. 1, these squibs abut a pair of holes 19 in the igniter body to provide communication to the primer element 14 as the squibs are ignited. Squibs 18 are separated from primer 14 by a thin plastic cover 22 which is readily ruptured upon ignition of the squib to permit initiation of primer 14. A ring 21 is secured in a threaded aperture within body 16 thereby to secure the primer 14 in place.

A groove 23 is formed along the squib cylinder and contains an insulating member 24 while a plurality of electrically conducting ball seats 25 are disposed within appropriate holes in member 24. As indicated in FIG. 1, each of the ball seats 25 is surrounded by an insulating sleeve 27 and passes through one of the sheets of conducting material indicated at 28, 32 and 33, and lying adjacent to the insulating member 24. Two pairs of leads each having prongs 29 and 31 are electrically connected to squibs 18 and engage the respective sheets 28, 32 and 33 in a "bite and wipe" contact. It should be noted that the inner prongs 31 are electrically interconnected by the central conducting sheet 32 but are insulated from the outer prongs 29 by the non-conducting member 24. The outer prongs 29 are insulated from each other as well as from inner prongs 31. This feature provides a greater reliability for the initiation of primer 14 since each squib is operated independently of the other.

Three holes formed in body 16 are substantially in alignment with the ball seats 25 and are internally threaded to receive a plurality of inserts 36. Disposed within each insert 36 is an electrical contact to transmit electrical impulses from source 20 to squibs 18 via seats 25 and the metal sheets 28, 32 and 33. Each insert 36 comprises an insulating sleeve 37 and a spring 38 disposed between cap 39 which is dished out to receive an appropriate ball 26, and a cap 41. Each cap 41 is electrically connected to one of the lead wires 40 from the ignition pulse generating equipment 20. The lead wire of the central insert 36 is electrically connected to one terminal of power source 20 while the lead wires of the remaining inserts are electrically connected to the other terminal of the supply 20. Lead-in wires 40 are electrically insulated from body 16 by the insulating sleeve 37 previously mentioned and a plurality of insulating discs 43 each disposed at the end of an appropriate sleeve 37. Each lead wire is also surrounded by an electrically insulated hermetic seal 44 to prevent shorting of the wires to ground.

A plurality of ball contacts 46 similar in construction to the ball contacts 26 of FIG. 1 are shown in FIG. 2. These contacts are disposed at 90° to contacts 26 (measured along the outer surface of cylinder 17) and include a spring biased mechanism 47 which is electrically shorted to the body 16 thereby to ground each of these contacts and to prevent ignition of squibs 18 when cylinder 17 is rotated so that the seats 25 engage balls 46.

A motor 45 is electrically connected to the guidance section (not shown) which supplies current to the motor via a gear train 49 which connects the output shaft of motor 45 to cylinder 17 for rotation thereof. The motor is geared also to shaft 53 which is coupled to micro switches 51 and 52 by a pair of cams 54 and 56 respectively. Cam 54 opens micro switch 51 which in turn opens the connection from the guidance section to motor 45 when the squib cylinder 17 has been rotated 90° by motor 45 after arming and cam 56 performs the same function after disarming. Furthermore, these switches 51 and 52 are useful for monitoring purposes to indicate externally whether the igniter is armed or disarmed.

During tactical operation of the missile the igniter is armed by rotating the cylinder squib to a position shown in FIG. 1 so that there is a through connection from the detonating wires 40 to squib 18 and igniter 14. However, prior to launching of the missile the squib cylinder occupies a position 90° displaced from that of FIGS. 1 and 2 so that the squibs 18 are electrically connected to casing 16 and grounded by the balls 46 and the ball detent spring 47. But, even if the squibs 18 are ignited by stray currents or faulty operation of the electrical shorting system, primer 14 cannot be initiated since the squibs are 90° out of firing position. This feature results in a double safety and minimizes the hazards of premature ignition and decreases the hazards to the personnel handling the missile.

In the event that one of the squibs 18 should be prematurely ignited, cylinder 17 may be removed and the expended squib replaced and the cylinder reinserted into the igniter body 16.

It should be apparent to those skilled in the art that by thus providing a mechanical as well as an electrical safety feature for the igniter, the reliability of the ignition system of a solid propellant rocket motor is increased. Since this invention may be practiced other than as specifically described, it should not be construed as limited by the illustrative example given hereinabove; but within the scope of the appended claims, it is susceptible of many alterations and modifications.

What is claimed as new and desired to be secured by Letters Patent of the United States is:

1. An igniter for the primer of a rocket motor comprising; a casing including a body portion affixed to the primer and having a plurality of holes in communication with the igniter, a cylinder disposed within said body portion and rotatable between an armed position and a safe position, said cylinder having a longitudinal groove and a plurality of transverse bores connected thereto, a plurality of electrically detonatable squibs respectively disposed with said bores, said bores being in alignment with the holes in said body portion only when said cylinder is in the armed position, a source of electrical power, electrical insulating means disposed in the longitudinal groove in said cylinder, a plurality of pairs of leads extending through said insulating means and each pair connected to a respective squib, a plurality of electrically conductive sheets lying on said insulating means and each electrically connected to at least one of said leads, said sheets being electrically insulated from each other by said insulating means, a plurality of electrically conductive ball seats extending through said insulating means and each electrically connected to a respective sheet, spring biased electrically conductive ball detent means in said body, each of said means electrically insulated from the others, and each cooperating with a respective ball seat when said cylinder is in the armed position, means connecting said detents to said power source when said cylinder is in the armed position, and means electrically grounding said ball seats when said cylinder is in the safe position thereby to prevent accidental detonation of said squibs.

2. The igniter of claim 1 wherein said means for grounding said ball seats comprises a plurality of spring biased ball detents displaced at about 90° from said ball detent means and each adapted to cooperate with one of said ball seats when said cylinder is in the safe position.

3. The igniter of claim 1 further comprising a motor, means connecting said motor to said cylinder to provide selective rotation thereof between the armed position and the safe position, at least one cam coupled to said motor in such a manner that rotation of the motor rotates the cam correspondingly, switch means actuated by said cam for stopping said motor upon rotation of said cylinder to a predetermined position.

References Cited by the Examiner
UNITED STATES PATENTS

| | | | |
|---|---|---|---|
| 2,486,362 | 10/49 | O'Brien | 102—70.2 |
| 2,599,314 | 6/52 | Bobb | 200—52 |
| 2,748,704 | 6/56 | Dinsmoor | 102—70.2 |

BENJAMIN A. BORCHELT, *Primary Examiner.*

ARTHUR M. HORTON, *Examiner.*